June 6, 1967

P. F. VERGES ETAL 3,323,167

MATRIX BELTS FOR ELECTRIC CONDUCTOR
INSULATION MANUFACTURING MACHINES

Filed July 15, 1964

June 6, 1967
P. F. VERGES ETAL
3,323,167
MATRIX BELTS FOR ELECTRIC CONDUCTOR
INSULATION MANUFACTURING MACHINES
Filed July 15, 1964
5 Sheets-Sheet 3
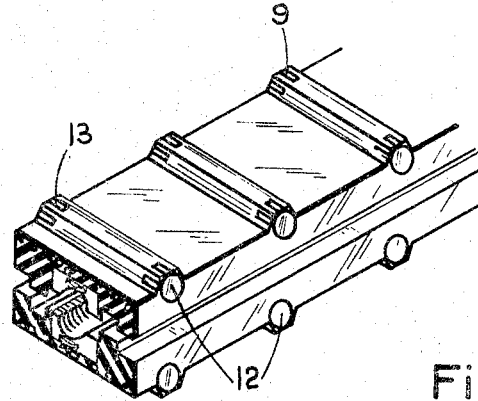
Fig. 6
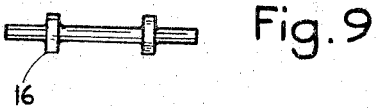
Fig. 7
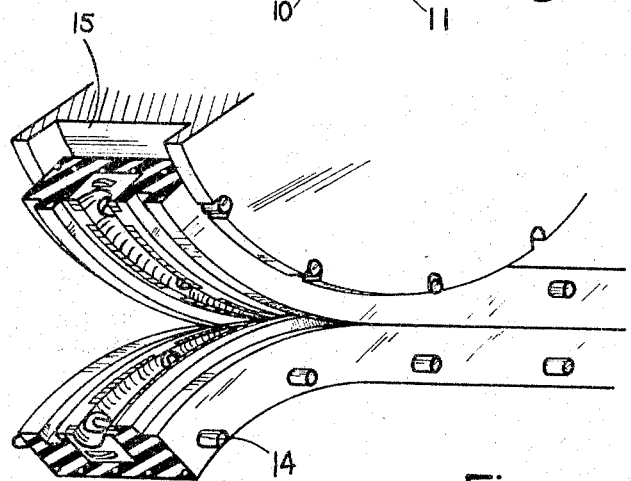
Fig. 8
Fig. 9

United States Patent Office 3,323,167
Patented June 6, 1967

3,323,167
MATRIX BELTS FOR ELECTRIC CONDUCTOR
INSULATION MANUFACTURING MACHINES
Paul Francois Verges, Boulogne-Billancourt, and Robert
Paul Delebecque, Sceaux, France, assignors to Societe
Anonyme de Telecommunications, Paris, France
Filed July 15, 1964, Ser. No. 382,731
Claims priority, application France, Mar. 6, 1964,
966,301
8 Claims. (Cl. 18—5)

This invention relates to improvements in machines of the kind described in the United States Patent No. 2,760,228, in the name of P. F. Verges, which relates to machines for the manufacturing of tubular insulation for electric conductors and describes a process for the continuous manufacturing thereof. In accordance with this process, an insulating tube of plastic material, preferably polyethylene, extruded through an extrusion die and formed around a conductor, is at the same time waisted at regular intervals, these waisted portions locating the conductor and the same time forming a partition which prevents water from passing between insulation and conductor. The thus insulated conductor may conveniently be employed as the central conductor of a coaxial pair. It may also be used to produce symmetrical pairs or quads or any other electrical circuit. The waisted portions are formed during the cooling of the extruded tube and the necessary compressing operation for this must be continued throughout the entire time of cooling. The mechanical device effecting this compression is a forming tool equipped with a system of endless matrix belts made of elastic material, preferably an elastomer, the drive system for which is constituted by toothing molded in the elastic material, this engaging with toothed metal wheels driven by an appropriate motor force. Such a forming tool can be equipped with two, three or four matrix belts. The matrix belts contact one another in precise register and enclose between them the conductor around which has been extruded an insulating tube the internal diameter of which is greater than the outer diameter of the conductor. The matrix cavities formed in the opposing faces of the belts contain projections which produce the said waisted portions by compression.

The present invention seeks to create new belt matrices of a form such that the accuracy with which the waisted portions are produced is increased and the belt strength made greater. The new matrix belts are mainly characterized by the following features:

A matrix cavity reinforced by means of flexible metal profiles;

Facility for locating movable teeth in the matrix cavities so that belts having matrix cavities of cylindrical form, which can be easily rectified by machining, can be used;

A drive system the toothing of which is reinforced either with the aid of metal sheaths encasing the teeth or with the aid of metallic inserts inside the teeth themselves;

Reinforcing in the form of strands of wire or other material contained in the body of the belt;

A system of keeping each matrix belt in a fixed position in relation to the other opposite or adjacent belt or belts.

The invention will be described in detail hereinafter, making reference to the attached figures in which:

FIGURE 1 illustrates an insulated conductor;

FIGURE 2 schematically illustrates a forming tool for providing a conductor with insulation, said tool being equipped with two belt matrices;

FIG. 3 is a fragmentary part-sectional and part-perspective view of a pair of cooperating matrix belts built in accordance with the invention, showing the principle of construction of such belts made of an elastic material with molded-in reinforcing strands and provided with mutually engaging longitudinal grooves and ribs for fixing their relative transversal position; the matrix cavity between said belts, in which the tubular insulation is formed, is reinforced by lengths of a flexible stacking of metal profiles between which are provided, at regular intervals, projecting pieces for the waisting of said tubular insulation.

FIG. 6 is a view of a pair of belts according to the invention, in which the driving teeth are reinforced by means of metal inserts provided therein, to replace the metal-sheaths of FIG. 4;

FIG. 7 is a view of a dumb-bell-shaped metal insert adapted to be used in the arrangement of FIG. 6;

FIG. 8 shows another possible arrangement of a pair of belts according to the invention, in which the belts are reinforced by means of metal pins transversally inserted therein, and in which the outer ends of said pins cooperate with a notched wheel for the driving of the belts;

FIG. 9 is a detailed view of a pin used in the arrangement of FIG. 8;

Figure 1:
Figure 2:
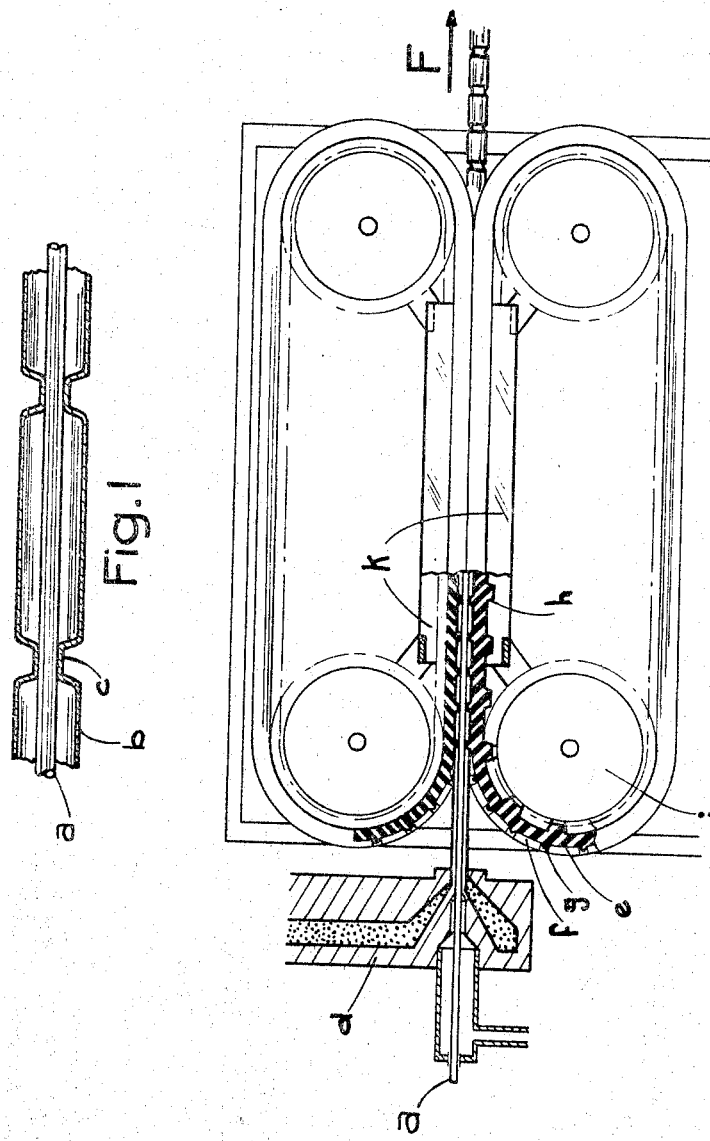

FIGURE 1 illustrates an insulated wire $a$ constituted by a conductor surrounded by an insulating tube $b$. The waisted portions $c$ keep the conductor centered within the tube. A system for producing this waisted tubular insulation and already described in the above-cited patent, is illustrated in FIGURE 2. An extrusion head $d$ produces an extruded tube of polyethylene. Extrusion takes place around the conductor through the extrusion head $d$ and the extruded tube of material advances in the direction of the arrow F, being transported by an appropriate drawing wheel which is not shown in the figure. At the exit from the extrusion head, the wire, surrounded by the tube of insulating material, passes through the forming tool consisting of the two matrix belts $e$. These matrix belts are in contact with one another and in exact register at the point at which they enclose the extruded tube. On their opposing faces they are equipped with matrix cavities $f$ containing projections $g$ which are designed to form the waisted portions on the insulating tube. The drive system for the matrix belts consists of molded toothing provided on the rear faces of the belts. This toothing is constituted by the teeth $h$ which engage with the teeth of metal wheels $i$ driven by an appropriate motor force. In order to guide the belts and to bring them into contact with one another, guides $k$ of U-section are provided along the straight runs of the belts.

In the following description the face of the belts which is inside the loop formed by the endless belts of FIG. 2 and in contact with the drive system will conventionally be called "the internal face," while the other face, which delineates the matrix cavity, will be called "the external face."

Figure 3:
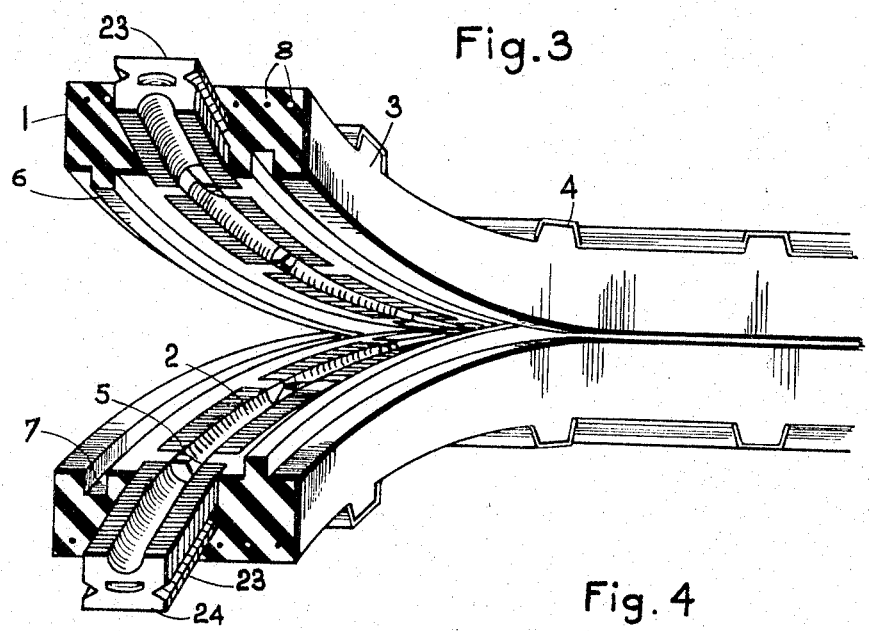
Figure 4:
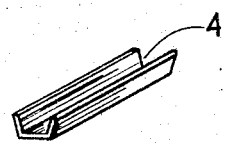
FIG. 4 shows a form of metal sheath encasing one of the driving teeth of the belts of FIG. 3.

FIGURE 3 shows a section of two matrix-belts of the type proposed in accordance with the invention. Each belt is constituted by a continuous strip of elastic material 1 provided on that of its faces coming into contact with the other belt with cylindrical cavities such as 2, designed to form the insulating material onto the conductor when said material is in the plastic state. The projections 5 placed in the cavities form the waisted portions in the insulating tube by compression. On their internal faces, the belts carry teeth 3 by means of which they are driven in conjunction with toothed wheels. In order to reinforce this toothing, each tooth 3 is encased in a metal sheath 4, illustrated separately in FIGURE 4. These metal sheaths are bonded to the elastic material by known means which are of no part of the invention. They will preferably be made of brass or brass-plated steel, to improve adherence. These metal sheaths are also designed to impart transverse rigidity to the belts and to make sure that the belts are accurately supported against the guides of the forming tool, these being represented by $k$ in FIGURE 2.

The axial strength of the belts is improved by reinforcement in the form of a set of strands 8 (FIG. 3), constituted by metal wires or wires of stranded textile material, these strands being molded in situ in the body of the belt. The strands are connected end to end (i.e. they are endless), being appropriately bonded at the time of molding the belt. The reinforcing may also be effected with the aid of a single strand carried round the belt in the form of a helix.

Since the conductor is generally to be insulated at a high speed, it is necessary to increase the rate of cooling of the extruded tube during the forming process. To this end, in the half-cylindrical cavity of a matrix belt of the type shown in FIG. 3, metal cooling elements are provided. FIG. 3 illustrates a belt to the plastic body of which lengths of a flexible elongated metal structure 23 are secured. Each such length consists of a stacking of small metal plates 24, preferably of brass, linked with each other through the agency of slots and tongues formed during the punching of the plates out of a metal strip.

Each tongue penetrates into the punched slot of the neighboring plate with a little tightening (as shown later on in FIGS. 12 and 13). The plates are made one after another in a continuous punching process in a press with a punch and die tooling.

At the time of manufacture of the belt, the lengths of flexible metal structure are attached to the mold before filling. Gaps (FIG. 3), reserved for the subsequent attachment of the projections, are provided between the successive lengths. After molding, the material of the belt adheres to the plates of the flexible structure and fills all the interstices. The cylindrical matrix cavity is then trued up "in situ" by milling and the projections 5 are put in place in the gaps. The half-circular notch in each of the plates may be formed before their attachment to the belts and finally trued up "in situ," or the whole of the machining of the half-circular notch may be effected "in situ."

In order that the waisted portions should be molded accurately, the relative positions of the projections in the two belts must be fixed accurately in the longitudinal direction and in the transverse direction too. In the longitudinal direction the correct relative positions are obtained thanks to the reinforcing of the drive teeth using the sheaths 4 described hereinbefore and by accurately adjusting the positions of the drive wheels for the matrix belts. In order to ensure that the belts have the correct positions in the transverse direction, guide ribs such as 6 are produced on the opposite faces of the belts, these ribs 6 engaging in grooves 7 in the mating faces.

Figure 5:
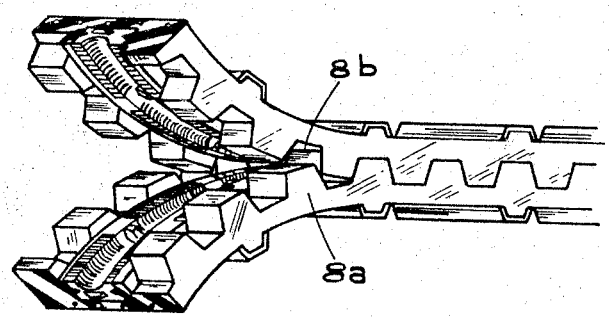
FIG. 5 is a fragmentary part-sectional and part-perspective view of a pair of cooperating belts according to the invention, showing how the grooves and ribs of the belts of FIG. 3 may be replaced by teeth provided in the elastic material and so arranged as to prevent relative transversal motion of these belts.

In FIGURE 5, belts similar to those illustrated in FIGURE 3 are shown, in which the tongues and grooves have been replaced by teeth 8a projecting from the faces carrying the matrix cavities. The teeth 8a of one belt engage in the spaces between the teeth 8b of the other, this fixing the relative positions of the two belts in the longitudinal direction. The tooth gaps extend below the belt faces in order to make sure that the relative positions of the belts are fixed in the transverse direction too.

FIGURE 6 illustrates another means of reinforcing the teeth carried on the driving faces of the belts. At the time of molding, a dumb-bell shaped component 10, as illustrated in FIGURE 7, is inserted in the teeth 9. The ends 11 of the dumb-bell are flush with the end faces of the belt teeth, at 12 and at 13, and it is at these points that the guides and the drive wheels come into contact with the teeth.

FIGURE 8 illustrates a section across two matrix belts in which the drive is effected through the medium of metal pins 14 fixed transversely in the elastic body of the belt. These pins engage in notches in a wheel 15. This notched wheel, which is driven from a motor system, imparts a longitudinal motion to the belt through the pins which it carries. The attachment of these pins is made more secure if they are provided with flanges 16, in the manner indicated in FIGURE 9, to prevent them from moving laterally.

Figure 10:
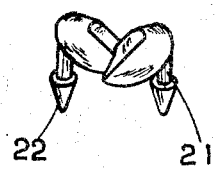
FIG. 10 shows a projecting piece used in the arrangement of FIG. 3 for the waisting of the tubular insulation.
Figure 11:
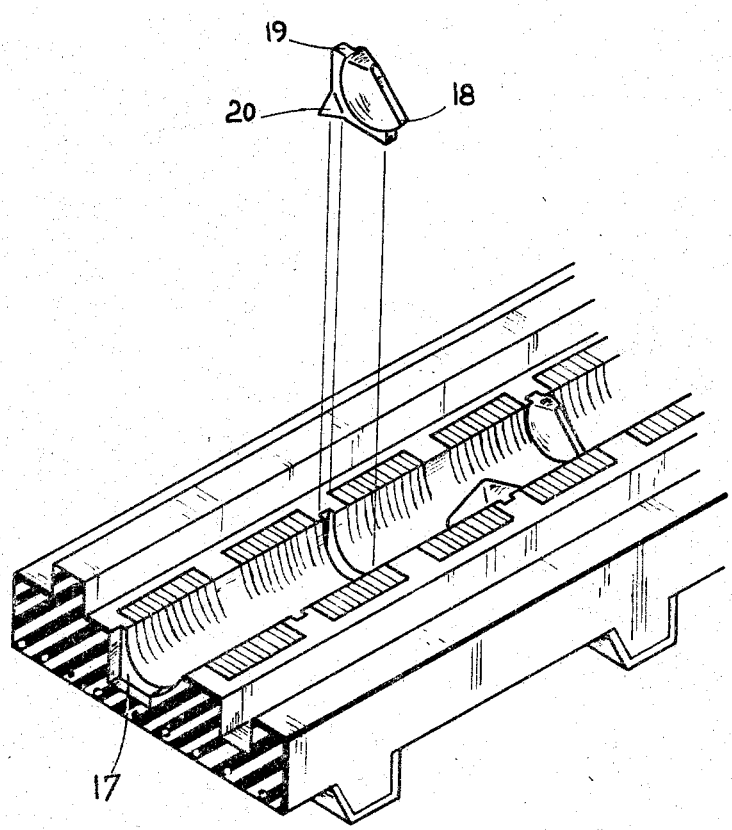
FIG. 11 shows another form of a projecting piece which may replace that of FIG. 10 and the method by which it may be secured in the wall of the matrix cavity.

With the aim of increasing accuracy of the outer diameter of the insulating tube surrounding the conductor, it is advantageous to correct the cylindrical part of the matrix cavities in the belt, after molding, by means of an appropriate machining. The correcting process is much facilitated if there are no projections in the part to be corrected. To this end, the belts are molded without forming any projections in the matrix cavities, the sheaths being fixed in the cavities after molding and correction. FIGURES 10 and 11 illustrate two exemplary embodiments of this. In FIGURE 10 two movable teeth are illustrated side by side, these being attached to the elastic belt by means of the pins 21, which are inserted in the holes punched or molded into the belt. These pins are provided at the end with a shoulder 22 which keeps them firmly in place in the elastic material. FIGURE 11 illustrates a differently shaped tooth. In the cavities in the belt, molded or milled recesses 17 are provided. Into these recesses the teeth 18 are inserted, the form of the latter being such that the projecting upper part rests against the cylindrical surface of the cavity and that an extension 19 of this projecting part extends into the recess. A shoulder 20 at the tip of this latter part holds the two firmly in place in the elastic material.

Figure 12:
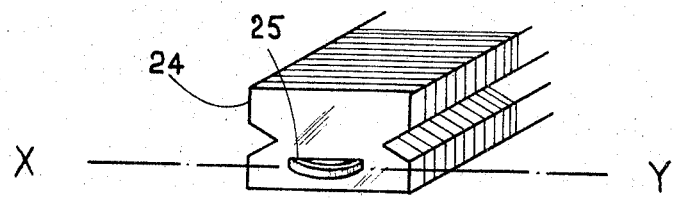
FIG. 12 shows a metal plate used in the stacking of metal profiles in the arrangement of FIG. 3, previous to its being machined to take the final shape shown in FIG. 3.

FIGURE 12 illustrates in greater detail the elements the assembly of which constitutes the flexible elongated metal structure 23 of FIG. 3. This structure is constituted by small metal plates 24, preferably of brass, linked with one another through the agency of slots 25 formed during the punching of the plates. At the time of manufacture of the belt, as already mentioned, lengths of this structure are attached to the mold before filling.

Figure 13:
FIG. 13 shows how plates such as those of FIG. 12 engage each other to form a flexible stacking for the arrangement of FIG. 3.

FIG. 13 shows the method by which plates such as 24 (FIG. 12) are assembled into a length of flexible structure. FIG. 13 is a section of plate 24 and a neighboring plate by a plane X–Y parallel to the length of and passing through the middle of the slot 25 of FIG. 12 and perpendicular to the faces of plate 24. As it may be seen in FIG. 13, each plate is provided with a tongue 27 which engages the slot of the next plate with a slight tightening and thus assembles each plate with the next one.

Figure 14:
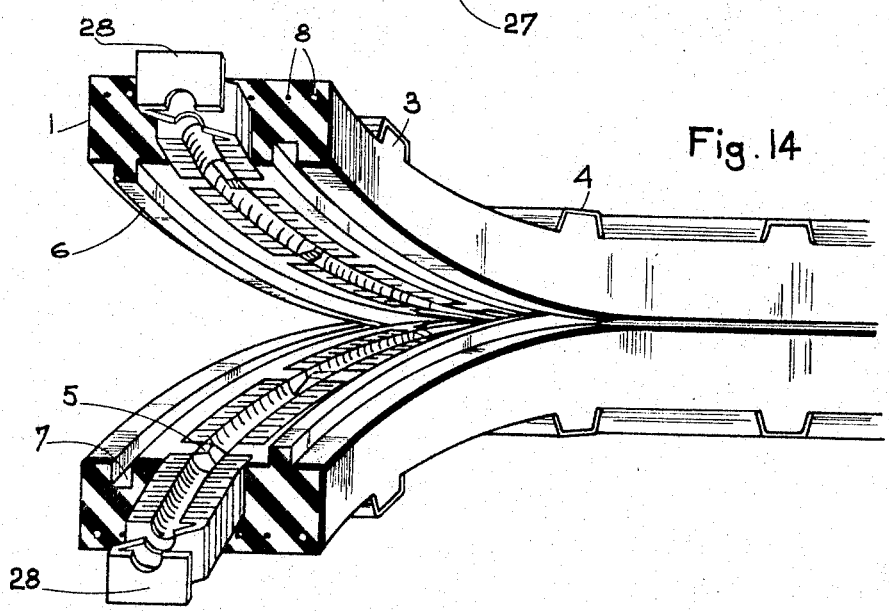
FIG. 14 shows another embodiment of a pair of belts according to the invention, in which the flexible stacking of metal profiles of FIG. 3 is replaced by a metal strip folded in bellows fashion.

FIG. 14 shows another embodiment of the belts of the invention, in which the lengths of flexible metal structure 23 of FIG. 3 are replaced by an arrangement which, instead of consisting of stacked metal plates, uses a single metal piece 28 made by the folding in bellows-fashion of a metal strip. This bellows-shaped structure is molded in the elastic material of the belt in the manner previously explained in connection with the structure of FIG. 3. The other elements of FIG. 14 are similar to those of FIG. 3 bearing the same reference numbers.

Figure 15:
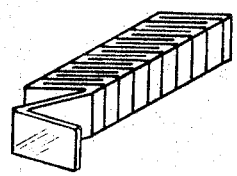
FIG. 15 shows the bellows-fashion folded metal strip used in the arrangement of FIG. 14, previous to its being machined to take the final shape shown in FIG. 14.

FIG. 15 shows the primitive form of the bellows-fashion folded strip, before its being machined for the half-circular notches delineating the matrix cavity. As already explained in connection with the structure of FIG. 3, these notches can be punched out of the strip before its being molded in the belt, or machined after the molding. The arrangement of FIG. 14 yields a structure stronger than that of FIG. 3, since the plates constituting the latter are more likely to separate under strain than the parts of the one-piece structure of FIG. 14, but the latter is more difficult to manufacture and requires a more complicated tool equipment.

In the foregoing, various types of matrix belts for forming tools equipped with two belts have been described. In certain cases, as indicated in the patent cited at the beginning of the description, the forming tools are equipped with three or four matrix belts. The devices described can be adapted to suit this circumstance without departing from the scope of the present invention.

What is claimed is:

1. In a machine for the continuous forming of a periodically waisted tubular insulation around a metallic electric conductor and comprising a plurality of endless belts made of a molded elastic material and in close contact with each other on opposing faces so as to delineate a matrix cavity formed of a plurality of partial matrix cavities respectively provided in each one of said belts, the arrangement which consists in providing in each one of said partial matrix cavities a flexible elongated metallic structure molded in and adhering to said elastic material, said metallic structure consisting of successive lengths separated by short intervals, each of said lengths consisting of an assembly of thin flat juxtaposed metal plates the planes of which are substantially perpendicular to the longitudinal motion direction of said belts, each of said plates being provided with a notch having the shape of a portion of a circle, and each of said intervals being provided with at least one projecting metal piece secured to said elastic material of said belts.

2. In a machine including an arrangement as claimed in claim 1 and comprising two belts, the arrangement in which said notches have a half-circular shape and in which the rectilinear open sides of said notches substantially coincide in space where said belts are in mutual contact.

3. In an arrangement for a machine as claimed in claim 1, the arrangement in which each of said assemblies consists of a stacking of separated thin metal plates.

4. An arrangement as claimed in claim 3, in which each of said metal plates is provided with a tongue engaging an aperture provided in one neighboring of said plates.

5. An arrangement as claimed in claim 1, in which said belts are kept in predetermined relative positions by means of grooves and ribs provided in the elastic material of said belts, each groove belonging to one of said belts engaging a rib belonging to another one of said belts.

6. An arrangement as claimed in claim 1, in which said belts are reinforced by metal wires substantially parallel to the longitudinal motion direction of said belts and molded in the elastic material thereof, and in which both ends of each of said wires are interconnected.

7. In a machine for the continuous forming of a periodically waisted tubular insulation around a metallic electric conductor and comprising a plurality of endless belts made of a molded elastic material and in close contact with each other on opposing faces so as to delineate a matrix cavity formed of a plurality of partial matrix cavities respectively provided in each one of said belts, the arrangement which consists in providing in each one of said partial matrix cavities a flexible elongated metallic structure molded in and adhering to said elastic material, said metallic structure consisting of successive lengths separated by short intervals, each of said lengths consisting of a metal strip folded in bellows-fashion into a succession of juxtaposed metal plates the planes of which are substantially perpendicular to the longitudinal motion direction of said belts, each of said plates being provided with a notch having the shape of a portion of a circle, and each of said intervals being provided with at least one projecting metal piece secured to said elastic material of said belts.

8. In a machine including an arrangement as claimed in claim 7 and comprising two belts, the arrangement in which said notches have a half-circular shape and in which the rectilinear open sides of said notches substantially coincide in space where said belts are in mutual contact.

References Cited

UNITED STATES PATENTS

| 2,760,228 | 8/1956 | Verges | 18—13 |
| 2,817,875 | 12/1957 | Harris et al. | 18—4 |

WILLIAM J. STEPHENSON, *Primary Examiner.*